No. 800,603. PATENTED SEPT. 26, 1905.
H. A. WILLIAMS.
MAGNETIC CLUTCH MECHANISM.
APPLICATION FILED FEB. 14, 1905.
4 SHEETS—SHEET 1.
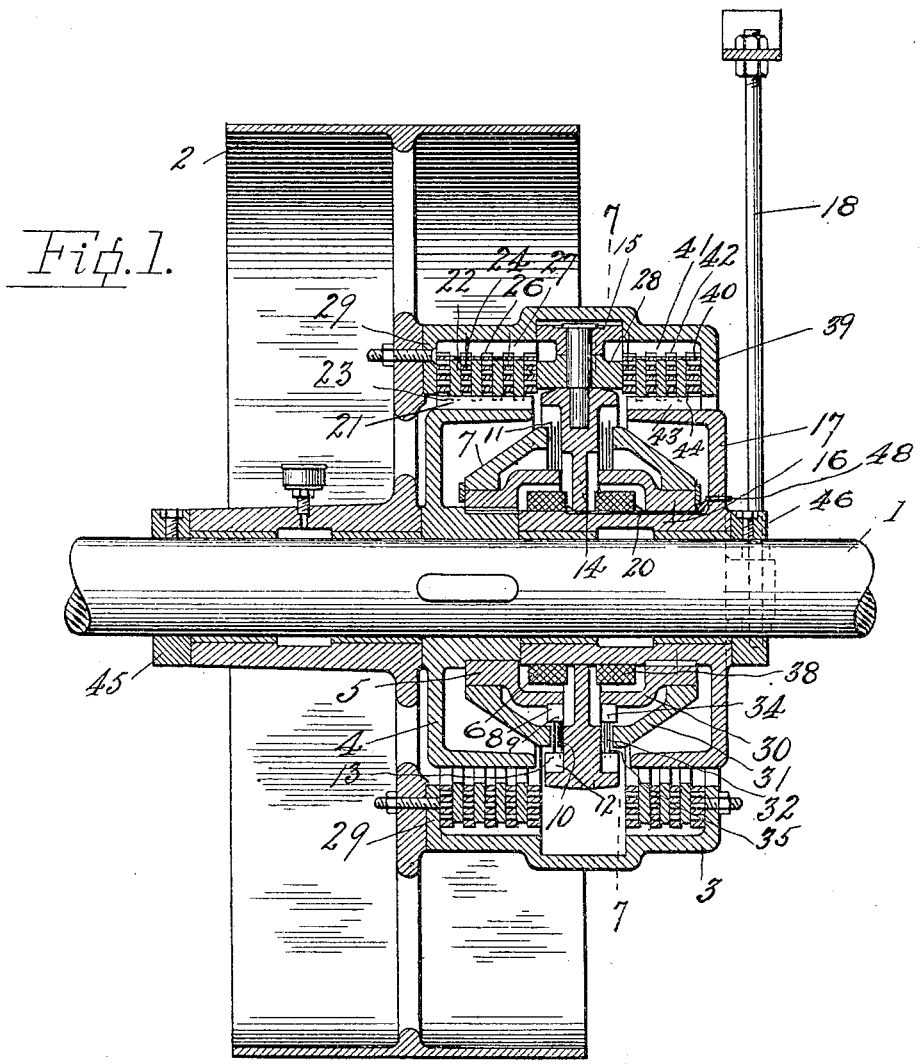
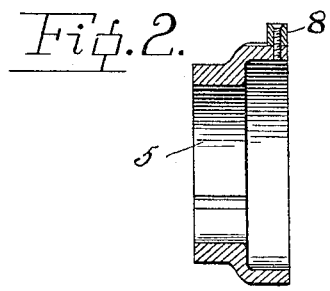
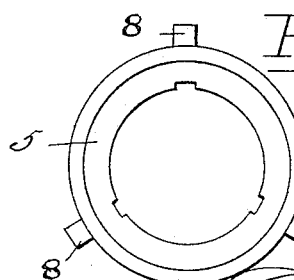
Witnesses
Harry A. Williams
Inventor
By Wm N. Moore
Attorney

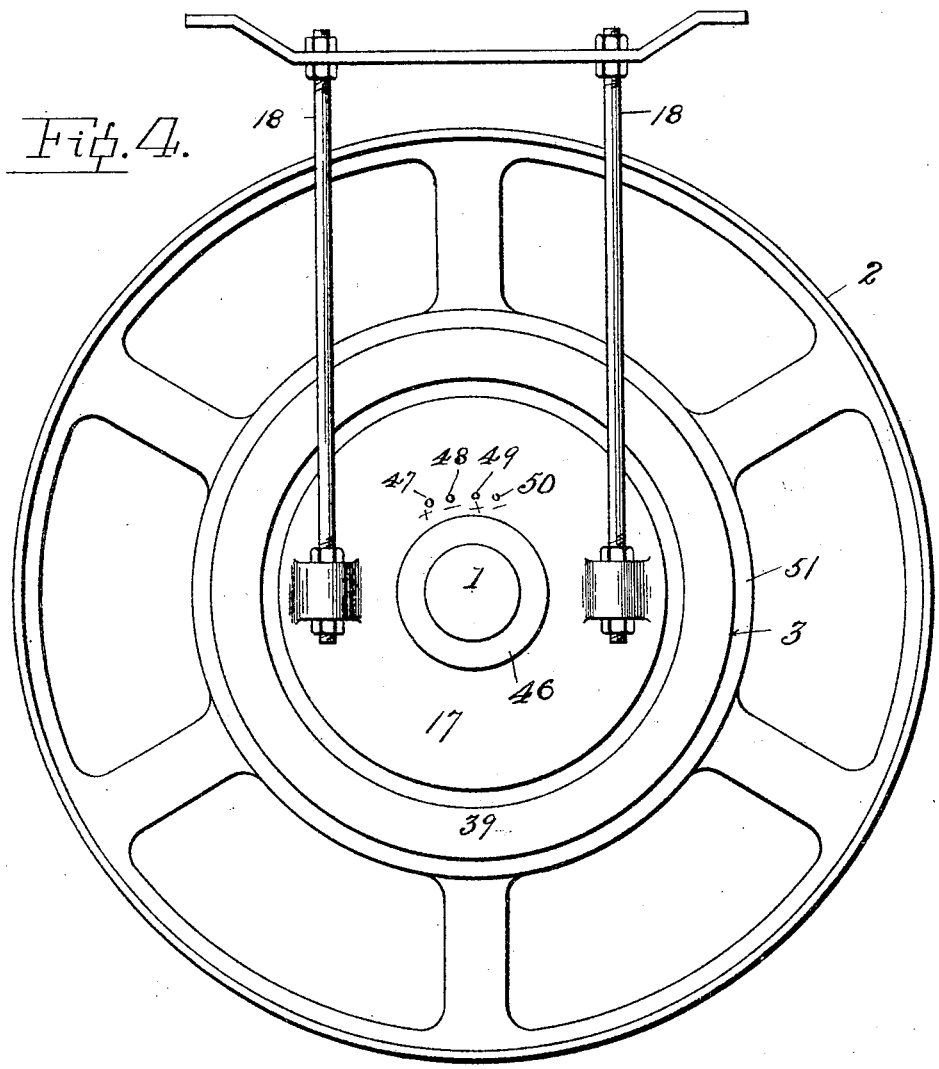
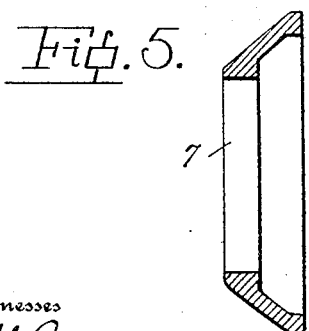
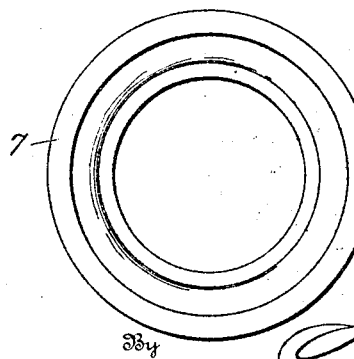

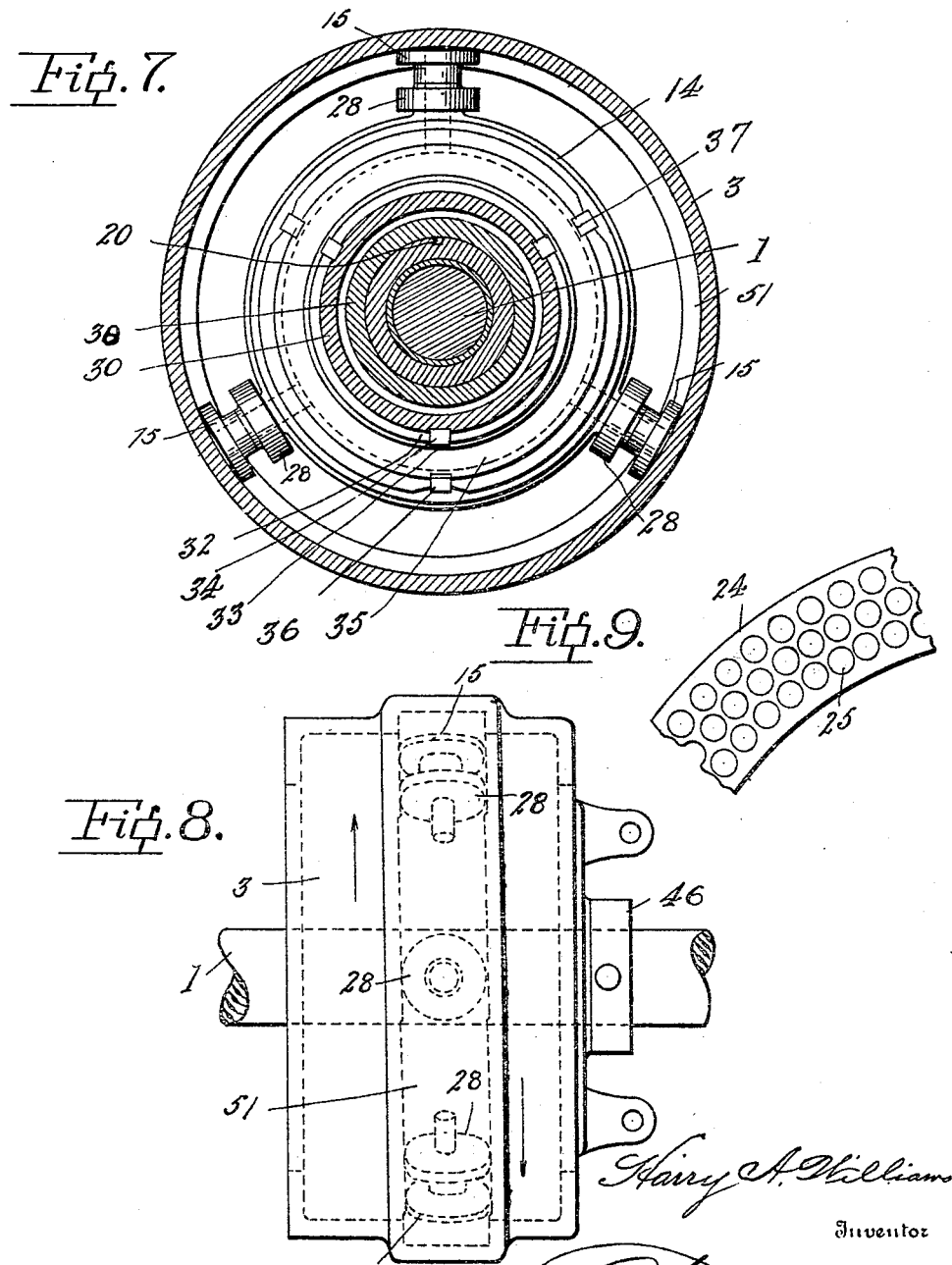

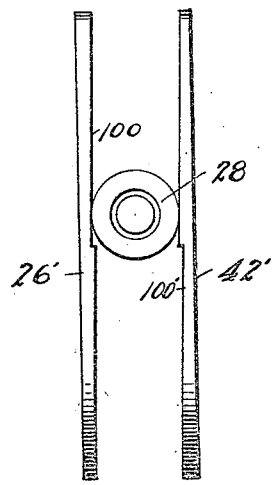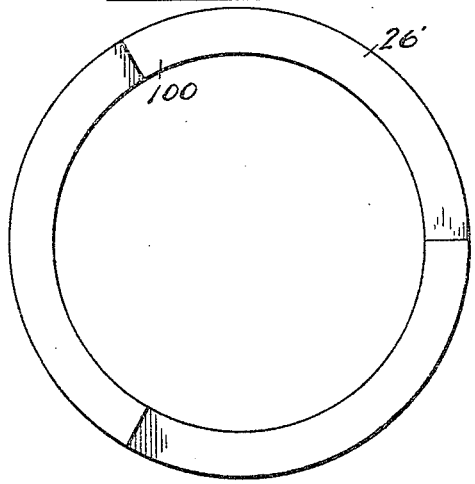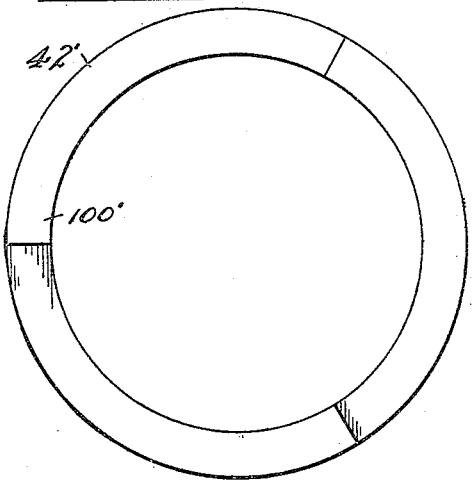

UNITED STATES PATENT OFFICE.

HARRY A. WILLIAMS, OF AKRON, OHIO, ASSIGNOR TO THE WILLIAMS ELECTRIC MACHINE COMPANY, OF AKRON, OHIO.

MAGNETIC-CLUTCH MECHANISM.

No. 800,603.      Specification of Letters Patent.      Patented Sept. 26, 1905.

Application filed February 14, 1905. Serial No. 245,577.

*To all whom it may concern:*

Be it known that I, HARRY A. WILLIAMS, a citizen of the United States, residing at Akron, in the county of Summit and State of Ohio, have invented certain new and useful Improvements in Magnetic Clutches, of which the following is a specification.

My invention relates to improvements in a magnetic-clutch mechanism, and applies particularly to a combined clutch and brake, the object being the production of a device of this character to be applied to an idle pulley on a rotating shaft to drive said pulley when desired and the brake being utilized to bring the driven pulley to its normal idle position.

I utilize the attractive force of magnetism for bringing the two parts of a magnetic clutch into engagement, and the engagement of the magnetic clutch operates to mechanically bring the main or pulley-driving clutch, which is a mechanical clutch, into frictional engagement, thus rotating the idle pulley. The brake-clutch is also operated by a magnetic clutch which is energized by magnetism. Thus it will be understood there are four clutches in the device—two actuating magnetic clutches, the frictional clutch for driving the pulley, and the clutch which acts as a brake to bring the driven pulley to rest. The pulley-clutch and the brake-clutch are each rendered operative or inoperative by the action of its own magnetic clutch as either is or is not energized.

The invention consists of an improved clutch and brake, each operated by an independent magnetic circuit induced by a coil and electrical connections. Thus the clutch and brake have each a coil and each a magnetic clutch operated independently by its own coil. When the magnetic clutch of the pulley-clutch is energized, the pulley-clutch is mechanically engaged, and when the said magnetic clutch is deënergized and the brake magnetic clutch energized the brake-clutch is rendered mechanically operative.

The invention further consists in certain novel features of construction and combinations of parts whereby the pulley-clutch and brake-clutch are mechanically brought into contact through intermediate means, as will be described and claimed.

In the drawings, Figure 1 is a vertical central sectional view of the device. Fig. 2 is a vertical central sectional view of one of the driving-disks, and Fig. 3 is a front view thereof. Fig. 4 is an end view of the device looking from the right in Fig. 1. Fig. 5 is a vertical sectional view of one of the pressure-disks and also forms part of the armature of the magnetic clutches, and Fig. 6 is a front view of the same. Fig. 7 is a sectional view on line 7 7 of Fig. 1. Fig. 8 is an elevation of the clutch-casing detached from the pulley, but adapted to be attached thereto by bolts. Fig. 9 is an enlarged detail view of one of the frictional plates used in the pulley or brake friction-clutches, showing fillers, which may be of wood, to produce a greater adhesive power in the contact-plates of the friction-pulleys. Figs. 10, 11, and 12 are detail views of camways.

Referring to the drawings, the shaft 1 is suitably supported and driven in usual manner by any desired power, and the pulley or drum 2 is free to rotate on said shaft; but when the pulley-clutch is in engagement the pulley rotates and is driven by the shaft, and said pulley will be referred to hereinafter as a "driven" pulley.

The clutch-casing 3 is rigidly secured, preferably by bolts, to the arms or spokes of the driven pulley and revolves with said pulley when driven. If desired, the casing may be made integral with the pulley.

I will first describe the construction of the pulley friction-clutch and its actuating magnetic clutch. Within the casing and keyed to the shaft to rotate therewith I locate the disk 4, which disk has keyed thereto the nonmagnetic driving-disk of the magnetic clutch 5, a coil 6 being inclosed within disk 5 for producing the magnetic circuit. The pressure-disk 7 is loosely mounted on the hub of disk 5 and forms part of the armature of the magnetic actuating-clutch. Said pressure-disk is free to slide longitudinally on said hub, and when the magnetic clutch is energized disk 7 will slide toward the right, Fig. 1. As plainly shown in Figs. 2 and 3, the disk 5 is provided on its perimeter with lugs 8, which are adapted to engage the recesses 9 of the contact-rings 10, and while these rings are carried in rotation by the disk they are free to slide longitudinally on said lugs. A complementary set or series of contact rings or plates 11 alternate in position with the series 10. These contact rings or plates 11 are carried in a manner similar to the plates 10 of the disk 5, being attached by lugs 12 and recesses 13 to the roller-disk 14, the plates 11 being free to slide longitudinally on the lugs 12. The roller-disk 14 is provided with three rollers 15, which support the disk by longitudinal pressure against a groove in the casing 3, to be described, and has a central bearing and is loose and free to turn on the hub 16 of the fixed supporting-disk 17. Said disk 17 is fixed in relation to the shaft 1 and is suspended from a support by the rods 18. A space 20 is allowed on the outer periphery of the hub 16 for the introduction of wires to make electrical connection for induction of the magnetic circuits, the connections being made to the coils of the magnetic clutches.

The pulley-clutch is composed of the following members: disk 4, which is provided with lugs 21, over which are adapted to slide the contact or friction rings 22, said rings being provided with recesses 23, having a longitudinal sliding movement on said lugs. Thus the rings or plates 22 are carried by and rotate continually with the disk 4, which is keyed to shaft 1 for rotation therewith. Alternately interposed between said rings or friction-plates 22 are the complementary friction-plates 24, having wood fillers 25 therein. These plates are provided with recesses 26, and lugs 27 on the casing fit in the recesses. These rings have a longitudinal movement also on the lugs, and when the pulley rotates, carrying with it the casing, the plates or rings 24 rotate with the pulley. In addition to the set of three rollers 15, carried by the roller-disk 14, a second series, 28, is also carried on the same hub with the rollers of the first series. These rollers 28 are in position to have a side bearing on the plates 22 24 of the friction-clutch, and said two series are held between said rollers 28 and the flange 29 of the casing 3.

The brake-clutch has practically a duplication of the members of the pulley-clutch and is used in combination therewith, the rollers 28 acting, in this instance, for the same purpose as in the pulley-clutch. The disk 30 is keyed to the hub 16 of the fixed disk 17 and is therefore non-rotatable. The pressure-disk 31, forming part of the magnetic armature, is free to slide on the hub of the disk 30. Said disk 30 has connected thereto the magnetic contact-rings 32, provided with recesses 33, which recesses fit over the lugs 34 on said disk, allowing a longitudinal movement of the rings. The roller bracket or disk also has a series of contact-plates 35 to revolve therewith, being connected thereto by lugs 36 and recesses 37, and these two series of plates 32 35 are alternately interposed one between another. A coil 38 is located within the disk 30. The brake friction-plates are located between the outer flange 39 of the casing 3 and the series of rollers 28. Two series of plates are employed. One series, 40, is attached to the casing by lugs 41 and recesses 42, and the other series, which alternates therewith, is attached to the fixed supporting-disk 17 by lugs 43 and recesses 44. The plates of the two series are permitted a longitudinal sliding motion on their respective lugs. The two collars 45 and 46 are provided to hold the pulley and clutch in determined position on the shaft.

The electrical connections for the pulley-actuating circuit are indicated at poles 47 and 48, and the brake-circuit at 49 50, Fig. 4, the wires entering at these points and passing to coils 6 and 38 through space 20, as described.

To operate the pulley-actuating magnetic clutch, and thereby engage the driving-shaft and drive the pulley, the electric circuit leading to poles 47 48, Fig. 4, is closed, the current energizing the pulley-actuating coil 6, which induces a magnetic flux, as shown by the arrow, drawing pressure-disk 7 to the right, Fig. 1, thus pressing the plates of the magnetic clutch between said disk 7 and the left face of the roller-disk 14. As shaft 1 and disks 4, 5, and 7 are revolving together the friction generated between the magnetic-clutch plates starts the roller-disk 14 revolving with said members. The two rollers 15 and 28, (see Fig. 1,) carried by the roller-disk, turn freely on their pintle, and as the roller-disk is revolved in the direction of the arrow, Fig. 8, the roller 15 travels and rotates against the edges or walls of a cam-groove 51, located on the interior of the casing 3. This groove is continuous around the interior of the casing, but at predetermined intervals is struck off at an incline from the center of the casing, as shown in dotted lines, Fig. 8, and assuming the magnetic friction-clutch to be engaged and the rollers 15 in position shown in dotted lines, Fig. 8, when the roller-disk is made to revolve, as described, the rollers 15 will travel in the direction of the arrow, the inclined grooves guiding the rollers to the left in said figure. The inclined movement of the rollers 15 in the groove causes the rollers 28, which are bearing against the pulley friction-plates, to press said plates over to the left against the flange 29 of the casing 3. The friction generated between said rollers, plates, and flange imparts motion to the casing and pulley, and the pulley is rotated with the shaft 1, it being understood that the roller-disk revolves, as well as the rollers thereon. Whether current must be applied continuously to coil 6 after the pulley-clutch has become engaged depends on the angle of inclination of the cam-grooves in the casing. If this angle is sufficiently small so that the rollers 15 will not roll in reverse direction to the rotation of the casing, then the clutch remains engaged without the assistance of the actuating magnetic friction-clutch.

In order to disengage the pulley-clutch and to apply the brake to bring the pulley to rest, the current is taken off from coil 6, (assuming the current to have been used continuously,) and the coil 38 is then magnetized by a current through a circuit connected to poles 49 and 50. A magnetic circuit is induced by said coil through the path indicated in arrows. The magnetic current moves the pressure-disk 31 against the magnetic friction-plates, pressing them against the face of the roller-disk. The series of contact-rings on disk 31 are non-rotatable. Thus the friction between these last-mentioned contact-rings and the contact-rings carried on the right side of roller-disk tends to retard the rotation of the roller-disk. Now as the roller-disk is retarded in its movement and while said disk and the casing are turning together the roller-disk is slackened in its speed in relation to the casing and the rollers 15 drop back in the direction of the arrow at the right side of Fig. 8. The movement of the rollers 15 in the cam-grooves toward the right moves rollers 28 away from the friction-pulley clutch-plates, thus releasing them from their pressure against the casing-flange, and a continuation of the backward retarding movement of the roller-disk presses the rollers 28 against the brake-clutch contact-rings, shoving them to the right in Fig. 1 against the flange 39 of casing 3, thus generating friction between rollers, plates, and flange. One series of these latter plates being carried by the revolving casing and the other series attached to the fixed supported disk 17, it will be easily understood that the friction between the moving disks and the fixed disks will tend to stop the rotation of the casing and with it bring the pulley to rest.

The modification illustrated in Figs. 10, 11, 12 is preferred in some instances. The plate or ring 26' and the ring 42', each take the place of the respective rings 26 and 42, against which the roller 28 bears in Fig. 1. Instead of using the inclined or cam groove 51, said groove is formed with true surfaces or walls, and ring 26' has cams 100, and ring 42' is provided with cams 100'. Thus the pulley friction-clutch is engaged by the movement of roller 28 up incline 100 and disengaged when the roller travels in reverse direction. In its reverse movement the roller travels up the incline 100' and closes the brake-clutch, as will be understood.

What I claim, and desire to secure by Letters Patent, is—

1. A shaft, a loose pulley thereon, a driving member rotatable with the shaft, a fixed support for the shaft, a loosely-supported rotatable member, means for frictional engagement between said loosely-supported member and pulley, combined with a magnetic clutch, and electrical connections whereby said clutch is energized to actuate the frictional means for driving the pulley.

2. The combination of a shaft, a loose pulley thereon, a driving member rotatable with the shaft, a support for the shaft, a loosely-supported rotatable member, a frictional clutch interposed between said loosely-supported member and pulley, with an armature carried by the driving member, a coil, and electrical connections to induce a magnetic flux through the armature and loosely-supported member to actuate the frictional clutch between said member and pulley.

3. A shaft, a loose pulley thereon, a driving member rotatable with the shaft, a fixed support for the shaft, a loosely-supported rotatable member, a frictional clutch interposed between said loosely-supported member and pulley, a disk on said driving member carrying contact-plates, contact-plates carried by said loosely-supported member, said plates alternating with each other, a movable armature and a coil, and electrical connections whereby a magnetic flux is induced to energize the armature, compressing said two series of plates to revolve the loosely-supported member, whereby the frictional clutch between the pulley and loosely-supported member is rendered operative.

4. A shaft, a loose pulley thereon, contact-rings carried by said pulley, a fixed support for the shaft, a driving member rotatable with the shaft, contact-rings carried by said member, said two series of rings alternating with each other, a loosely-supported rotatable member adapted to compress said rings, an armature rotatable with the shaft, a coil, and electrical connections to induce a magnetic flux between said armature and loosely-supported member to compress said contact-rings and drive the pulley.

5. A shaft, a loose pulley thereon, a casing carried by said pulley, contact-rings carried by said casing, a fixed support for the shaft, a driving member rotatable with the shaft, contact-rings carried by said member, said two series of rings alternating as described, a loosely-supported rotatable member, an armature rotatable with the shaft, a coil and electrical connections to energize said armature whereby said loosely-supported member is rotated to press said contact-rings into frictional engagement to drive the pulley.

6. A shaft, a loose pulley thereon, a casing carried by said pulley, contact-rings carried by said casing, a fixed support for the shaft, a driving member rotatable with the shaft, contact-rings carried by said member, a loosely-supported rotatable member, contact-rings carried by said member, contact-rings carried by the driving member, and electrical connections to induce a magnetic circuit through the last-mentioned set of rings, whereby the pulley is driven, all combined substantially as described.

7. A shaft, a loose pulley thereon provided with a casing, a friction-clutch within said casing, a driving member rotatable with the shaft, a loosely-supported rotatable member, means for generating friction between said two last members, and means within the casing whereby the friction-clutch is brought into engagement by the loosely-supported member.

8. A shaft, a loose pulley thereon provided with a casing, a friction-clutch within the casing, a driving member rotatable with the shaft, a loosely-supported rotatable member, a magnetic coil, and electrical connections whereby said coil energizes the driving member and loose member to rotate the latter member thus compressing the friction-clutch.

9. A shaft, a loose pulley thereon provided with a casing, a driving member, a loosely-supported rotatable member, friction-plates between the casing and rotatable member, means for rotating said latter member, and means whereby the rotatable member compresses the friction-plates to drive the pulley.

10. A shaft, a loose pulley thereon provided with a casing, a friction-clutch within said casing, a driving member, a loosely-supported rotatable member, means in connection with the driving member to rotate said loose member, and means whereby the rotatable member operates the friction-clutch.

11. A shaft, a loose pulley thereon provided with a casing, friction-plates carried by said casing, a driving member and friction-plates carried thereby adapted to engage the plates on the casing, a loosely-supported rotatable member, means in connection with the driving member to rotate the loose member, and means whereby the rotatable member compresses said friction-plates to drive the pulley.

12. A shaft, a loose pulley, a casing carried by the pulley, a loosely-supported rotatable member, a driving member therefor, friction-plates on the casing, friction-plates on the driving member, and rotatable means on the loosely-supported member for compressing said friction-plates to drive the pulley.

13. A shaft, a pulley, a casing carried by the pulley, a loose rotatable member, a driving member therefor, friction-plates on the casing, friction-plates on the driving member, rolls carried by said rotatable member having a bearing on the friction-plates, and means for compressing said friction-plates.

14. A shaft, a pulley thereon, a casing carried by the pulley, a loose rotatable member, a driving member therefor, rollers carried by said loose rotatable member, a friction-clutch between said latter member and the pulley, and means whereby said rollers are operated to compress the friction-clutch to drive the pulley.

15. A shaft, a pulley thereon, a casing carried by the pulley, a friction-clutch, a loose rotatable member, a driving member therefor, rollers carried by said loose rotatable member, cam-guides in the casing for said rollers, and a second series of rollers carried by the loose rotatable member bearing on the friction-clutch.

16. A shaft, a pulley thereon, a casing carried by the pulley friction-rings carried by the casing, a loose rotatable member and a driving member therefor, friction-rings carried by said driving member, a series of rollers on the loose member, cam-guides in the casing for said rollers, and a second series of rollers carried by said rotatable member having a bearing on the friction-plates.

17. A shaft, a pulley thereon, a casing carried by the pulley, friction-rings on the casing, a loose rotatable member and a driving member therefor, friction-rings carried by the driving member, a series of rollers on the loose member, cam-guides in the casing for said rollers, a second series of rollers carried by the loose rotatable member adapted to engage the friction-plates, and a coil and armature for actuating said rotatable member to drive the pulley as described.

18. A shaft, a pulley thereon, a casing carried by the pulley, a friction-clutch, a loose rotatable member, a driving member therefor, rollers carried by said loose rotatable member cam-guides in the casing for said rollers, a second series of rollers carried by the loose rotatable member bearing on the friction-clutch to drive the pulley, and means for retarding said loose rotatable member for bringing the pulley to rest.

19. A shaft, a pulley thereon, a casing carried by the pulley; rings carried by the casing, a loose rotatable member and a driving member therefor, rings carried by said driving member, a series of rollers on the loose member, cam-guides in the casing for said rollers, a second series of rollers carried by the loose rotatable member bearing against said rings to drive the pulley, and means for retarding the loose rotatable member to bring the pulley to rest.

20. A shaft, a pulley thereon, a casing carried by the pulley, friction-rings on the casing; a loose rotatable member and a driving member therefor, friction-rings carried by the driving member, a series of rollers on the loose member, cam-guides in the casing for said rollers, and a second series of rollers carried by said loose rotatable member having a bearing on said friction-plates to drive the pulley, and means actuated by said two series of rollers for bringing the pulley to rest.

21. In combination with a shaft and driven pulley, a friction-clutch, a loosely-mounted rotatable member, and a driving member; a second friction-clutch, and means whereby the loosely-rotatable member may be operated to engage the first friction-clutch to drive the pulley and also to operate the second clutch to stop the pulley and simultaneously disengage the first clutch.

22. In combination with a shaft and driven pulley, a friction-clutch, a loosely-mounted rotatable member, and a driving member; a second friction-clutch having a fixed bearing, and means whereby the loosely-mounted rotatable member may be operated to engage the first friction-clutch to drive the pulley and also to operate the second clutch to stop the pulley and simultaneously disengage the first clutch.

23. In combination with shaft and driven pulley, a friction-clutch, a loosely-mounted rotatable member and a driving member; a second friction-clutch having a fixed contact-surface, and electrical connections whereby a separate magnetic current is induced to operate the rotatable member to engage the first clutch, and also to disengage said clutch and engage the second clutch successively.

24. In combination with a shaft and driven pulley, a casing on the pulley, guideways in said casing, a loosely-mounted rotatable member carrying rollers, a driving member and a friction-clutch; a second friction-clutch, and means whereby the loosely-mounted rotatable member is operated to engage the first clutch, and also to disengage said clutch and engage the second clutch successively.

In testimony whereof I have affixed my signature in presence of two witnesses.

HARRY A. WILLIAMS.

Witnesses:
RAYMOND E. LEWIS,
EDWIN F. VORIS.